UNITED STATES PATENT OFFICE.

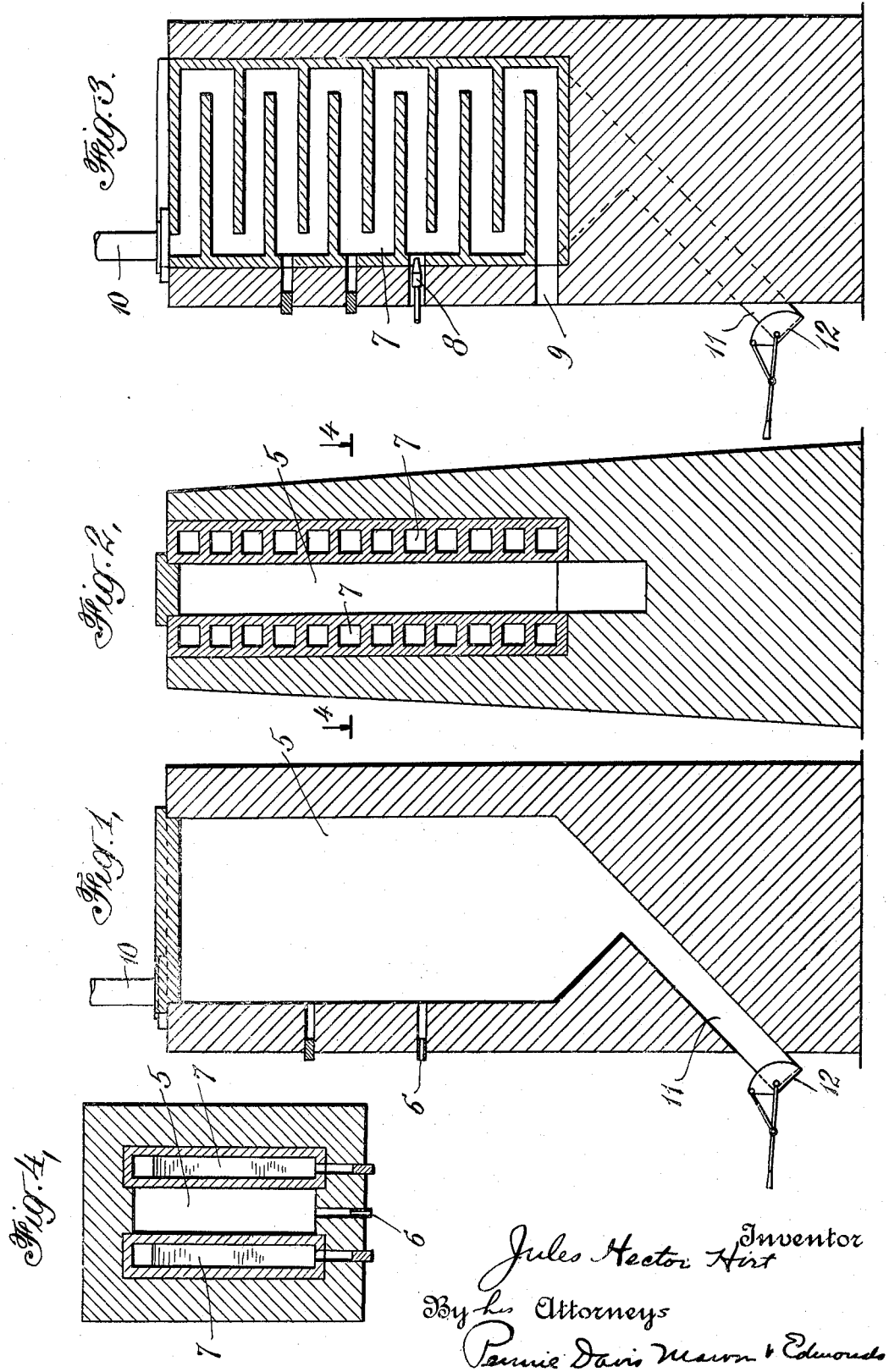

JULES HECTOR HIRT, OF EL PASO, TEXAS, ASSIGNOR TO ALVARADO MINING AND MILLING COMPANY, OF NEW YORK, N. Y., A CORPORATION OF MAINE.

TREATMENT OF ORES.

1,375,002.   Specification of Letters Patent.   Patented Apr. 19, 1921.

Application filed January 24, 1920. Serial No. 353,821.

*To all whom it may concern:*

Be it known that I, JULES HECTOR HIRT, a citizen of the United States, residing at El Paso, in the county of El Paso, State of Texas, have invented certain new and useful Improvements in the Treatment of Ores; and I do hereby declare the following to be a full, clear, and exact description of the invention, such as will enable others skilled in the art to which it appertains to make and use the same.

This invention relates to an improved process of chloridizing ores, concentrates, and other metallurgical products, to convert the metal values into chlorids or oxychlorids, which are retained in the ore body and recovered therefrom, for example, by leaching with a suitable solvent. It is a characteristic advantage of the invention that the choridizing operation is accomplished without objectionable loss of metal values by volatilization.

The chloridizing of gold, silver or copper ores is recognized to be a difficult and delicate operation because of the losses which tend to take place, by volatilization or decomposition, if the temperature is too high, the chlorids escaping in a volatilized state and being lost, or decomposing into insoluble metal values which resist the subsequent leaching operation.

According to the present invention, the chloridizing or chlorinating operation is carried out without objectionable loss of volatile chlorids, and without objectionable decomposition thereof.

In the process of the present invention, advantage is taken of the fact that copper, lead, silver and gold chlorids melt and begin to volatilize at relatively low temperatures, and, in the preferred embodiment of the invention, the chloridizing or chlorination of the ore is effected at a relatively low temperature. I have discovered that if a body or column of ore is heated by conduction in any suitable manner, that is, by indirect heating as distinguished from heating by bringing the heating gases into direct contact with the ore, and if chlorin gas is passed through the body of heated ore, efficient chloridizing is effected at a relatively low temperature. To a lesser extent, similar advantages can be obtained by passing the vapors of a volatilized chlorid into the heated ore to effect the chlorizing thereof; but materially higher temperatures may be required when vaporized chlorid is thus used.

The process of the present invention is of particular value for the treatment of low grade copper ores and silver and gold ores, for the purpose of converting the metal values into chlorids or oxy-chlorids which are retained in the ore and recovered therefrom by leaching. The ores are preferably oxid or oxidized ores, but sulfid ores may also be treated. It is not necessary for the ore to be completely dry, as wet or moist ores will be adequately dehydrated by the preliminary heating to which they are subjected prior to their chorination or chloridation.

An apparatus suitable for use in the practice of the invention is illustrated in the accompanying drawing, in which: Figure 1 is a vertical section through the furnace; Fig. 2 is a vertical section in a plane transverse to that of Fig. 1; and Fig. 3 is a vertical section through the heating flues, and Fig. 4 is a section on the line 4—4 of Fig. 2.

The improved process of the present invention can be carried out in different ways, and in different types of apparatus, provided the ore body is subjected to a sufficient heat for the clorination, and the clorin or vaporized chlorid is brought into contact and reactive relation with the heated ore at a proper temperature. A particularly advantageous manner of carrying out the improved process is to feed the ore progessively into and through an upright or vertical retort or chamber 5, and to heat the mixture therein to a sufficient temperature and for a sufficient time, while introducing chlorin or the vaporized chlorid into the ore where it is thus heated through an inlet 6. The upright or vertical retort or chamber may thus be of rectangular construction and of a construction similar to that of coke-ovens, but made of materials resistant to the chemical action of the chlorin and other materials undergoing reaction therein. These upright or vertical retorts or chambers may thus be made with flues 7 in their side walls, with provision such as the burner or burners 8 for heating them at their central portions or for a sufficient portion of their length. It is preferable to so regulate the heating action that the upper and lower ends of the retorts will not be heated, to permit cooling of the ore passing downwardly from the central reacting zone, and to prevent undue heating of the incoming charge, although it is advantageous to subject the incoming charge to sufficient preheating to dry it thoroughly and to facilitate subsequently heating it to the reaction temperature; but the incoming ore body should be maintained at a temperature well below that of condensation of any volatilized chlorids, so that the volatilized chlorids cannot escape in vapor form either through the incoming charge or through the outgoing charge without condensation therein. Cold air may thus be drawn in through an inlet 9 to the flues 7 near the bottom of the retort or chamber and thereby preheated by the material that is undergoing treatment and is being discharged through the lower part of the retort. Similarly the hot products of combustion may be passed advantageously through the flues 7 at the upper part of the retort or chamber to preheat the incoming mixture before escaping through a stack 10.

When the retort or chamber has been once charged, the process can be made continuous, and requires merely the progressive charging of further amounts of the ore at the top and the regulated discharging of the cooled chloridized ore at the bottom through an outlet 11 and controlled by a closure 12. The ore itself, both before and after chloridizing, forms an effective seal for the retort or chamber, inasmuch as the cooler portions of the ore at both the inlet and outlet ends of the chamber effectively condense any chlorid or oxy-chlorid vapors that would otherwise tend to escape therethrough. The vapors condensed at the top of the chamber in the incoming ore are carried downwardly therewith into the reacting zone while those which condense in the lower outgoing portion of the charge are discharged therewith so that they can be subsequently recovered therefrom by leaching.

The chlorin, as above pointed out, is introduced into the body of ore at that portion of the retort where it is heated to the reacting temperature. It is a characteristic feature and advantage of this improved process that the body of ore requires maximum heating only to or near the melting point of the metal chlorid to be formed by the passage of the chlorin or chlorid vapors through the heated ore body; and that the retort need be heated for only a portion of its length, that is, the ore body need not be maintained for a prolonged period of time at the chloridizing temperature and in the chloridizing zone, but the chloridizing action is sufficiently rapid so that only a short period of chlorination at the proper temperature is required.

It is a further advantage of the invention, as above mentioned, that very low temperatures are sufficient for the chloridation or chlorination, particularly when chlorin is used as the chloridizing agent. A temperature of as low as 450° C. may be sufficient for the chloridizing of a silver ore or of a copper ore, while a much lower temperature of about 150° may be sufficient with a gold ore. The advantages of such low temperatures will be manifest, inasmuch as they involve a marked economy in the heat required, and materially reduced corrosive action upon the retort or furnace, so that the retort or furnace can be constructed of a material that requires merely to resist such corrosive actions at such relatively low temperatures. These low temperatures likewise favor the formation of the chlorids or oxy-chlorids in a form well adapted for subsequent leaching, and avoid objectionable decomposition such as might result from heating to higher temperatures. The tendency to escape in a volatilized form is also reduced by the use of lower temperatures for the chloridation.

With silver or copper ores which contain iron, the process may advantageously be practised at a temperature such that any iron chlorid formed will be, to a greater or less extent, decomposed, so that it will not be necessary to leach out the iron chlorid with the copper or silver chlorids or oxy-chlorids, and so that less chlorin will be required for the chlorination. However, the presence of iron chlorid in the solution assists in dissolving out silver and gold chlorids, so that the presence of iron chlorid in the chloridized ore is not particularly objectionable.

When, instead of chlorin, a vaporized chlorin is used for the chloridizing operation and is introduced into the ore body heated to a reactive temperature, the temperature required may be correspondingly increased, depending upon the temperature required for the vaporization of the chlorid used as the chloridizing agent. With sodium chlorid, the temperature must thus be such as will vaporize the sodium chlorid and permit it to be introduced in vapor form. The same is true of other chlorids which may be used as chloridizing agents, such as calcium chlorid or iron chlorid.

In a furnace of the character above referred to, that is, having a vertical or upright retort or chamber, or a series of such retorts or chambers, and heated by conduction through flues in the side walls thereof, the heating can be effected with any suitable fuel, such as oil or gas or pulverized coal, as will be readily understood. Where such a furnace is heated to the reacting temperature only at its central portion, the upper portion will form the preheating zone and the lower portion the cooling zone, and the incoming charge as well as the outgoing cooled chloridized ore will serve as the seals for condensing any volatilized chlorid which may tend to escape therethrough so that ultimately all of the chlorid will be discharged from the bottom of the retort in a condensed form and in admixture with the chloridized ore.

The process of the present invention is of particular value for the treatment of non-sulfid or oxidized ores, as distinguished from sulfid ores, although it is also applicable to the treatment of sulfid ores. Even low grade ores containing but a small percentage of metal values can be effectually chloridized by the process of the present invention and the values converted into chlorids or oxy-chlorids well adapted for the subsequent recovery thereof by leaching. The process is also of particular application to low grade copper, silver and gold ores, but is likewise applicable to lead, lead-zinc and other ores.

The amount of chlorin or chlorid required will vary with the amount of the ore constituents to be chloridized. It is not necessary to use a large excess of chlorin, and the process should preferably be so carried out that all of the chlorin introduced is completely used up in the chloridizing operation, while using sufficient chlorin to secure complete chloridizing of the metal values.

The chlorin can be generated from any suitable source, or it can be supplied from containers of liquid chlorin. Where bleaching powder is available in large amount and at moderate expense, this may be used as the source of the chlorin; or the chlorin may be supplied directly from a chlorin generator, such as an electrolytic cell.

Another advantage of the process of the invention is that fine grinding of the ore is not necessary, inasmuch as the chlorin will readily penetrate to the inside of the ore particles if they are sufficiently porous.

Instead of carrying out the process of the present invention in furnaces constructed as above described, other suitable types of furnaces can be used which will enable the desired heating to be brought about and which will withstand whatever corroding action may tend to take place at the temperatures and with the ingredients used. Horizontal or inclined heated chambers or retorts can thus be used, provided they have suitable heating means for heating them to the proper temperature and means for discharging therefrom the ore to be chloridized and for supplying thereto the chlorin or vaporized chlorid.

After the ore has been chloridized and the metal values converted into chlorids or oxy-chlorids, the ore is then subjected to a leaching operation for the purpose of extracting therefrom the chlorids or oxychlorids so formed. In this leaching operation any suitable solvent can be used which will dissolve the chlorids formed. The ore may thus be leached with a cyanid solvent, with a hyposulfite solution, with a saturated brine (sodium chlorid) solution, with an acid brine solution (containing 1 or 2% of hydrochloric or sulfuric acid), a brine solution containing ferric chlorid, etc. The ore may thus be leached in any suitable manner which is available for the leaching and extraction of the chloridized values; and the values can be recovered from the leached liquor thus produced in any suitable manner, as will be readily understood.

The process of the present invention is related to the process of my companion application, Serial No. 350,576, and embodies certain of the same features of novelty and of operation; while it involves other features of improvement and of differentiation from the process of said companion application.

I claim:

1. The method of chloridizing ores, metallurgical products and the like, which comprises heating a confined body of the same intermediate its ends to a temperature appropriate to the chloridizing, and introducing the chloridizing agent to the heated ore in a gaseous or vapor form.

2. The method of chloridizing ores, metallurgical products and the like, which comprises heating a confined body of the same intermediate its ends to a temperature appropriate to the chloridation, and introducing chlorin gas into the heated material to effect the chloridation thereof.

3. The method of chloridizing ores, metallurgical products and the like, which comprises heating a confined body of the same intermediate its ends to a temperature appropriate to the chloridation, and introducing a volatile chlorid in vapor form into the heated body to effect the chloridizing thereof.

4. The method of chloridizing ores, metallurgical products and the like, which comprises progressively feeding a charge of the material to be chloridized through a preheating zone, a reaction zone, and a cooling zone, introducing into the material in the reacting zone a chloridizing agent in gaseous or vapor form, and maintaining the temperature of the material in the preheating and cooling zone such as to prevent escape of volatile chlorids therethrough.

5. The method of chloridizing gold, silver or copper ores, metallurgical products and the like, which comprises feeding a body of ore through an externally heated retort or chamber, preheating the material entering the chamber, heating the material to a reacting temperature therein, and cooling the material being discharged from the chamber, and introducing chlorin gas into the material heated to the reaction temperature to effect the chloridizing thereof, the temperature of the incoming and outgoing material being maintained below that of condensation of volatile chlorids.

6. The method of chloridizing ores, metallurgical products and the like, which comprises establishing a body of such material, subjecting the body to heat from an external source at a zone intermediate its ends while the ends are maintained in a cooler state and introducing a chloridizing agent in a gaseous or vaporous form to the ore in the heated zone.

7. The method of chloridizing ores, metallurgical products, and the like, which comprises establishing a body of such material, subjecting the body to heat from an external source at a zone intermediate its ends, while the ends are maintained in a cooler state, introducing a chloridizing agent in a gaseous or vaporous form to the ore in the heated zone and advancing the body of material through said zone by the withdrawal of chloridizing material at one end and the addition of fresh material at the other.

In testimony whereof I affix my signature.

JULES HECTOR HIRT.